(12) United States Patent
Kuhn et al.

(10) Patent No.: US 10,364,482 B2
(45) Date of Patent: Jul. 30, 2019

(54) COPPER-ZINC ALLOY, BAND MATERIAL COMPOSED THEREOF, PROCESS FOR PRODUCING A SEMIFINISHED PART COMPOSED OF A COPPER-ZINC ALLOY AND SLIDING ELEMENT COMPOSED OF A COPPER-ZINC ALLOY

(71) Applicant: WIELAND-WERKE AG, Ulm (DE)

(72) Inventors: Hans-Achim Kuhn, Illertissen (DE); Gerhard Thumm, Erbach (DE); Maher Ababneh, Birmingham (GB); Volker Voggeser, Senden (DE); Jeremy Bell, Wolverhampton (GB)

(73) Assignee: WIELAND-WERKE AG, Ulm (DE)

( * ) Notice: Subject to any disclaimer, the term of this patent is extended or adjusted under 35 U.S.C. 154(b) by 588 days.

(21) Appl. No.: 15/060,672

(22) Filed: Mar. 4, 2016

(65) Prior Publication Data
US 2016/0289797 A1    Oct. 6, 2016

(30) Foreign Application Priority Data
Mar. 31, 2015   (DE) .................. 10 2015 004 221

(51) Int. Cl.
*C22C 9/04*      (2006.01)
*C22F 1/08*      (2006.01)
(Continued)

(52) U.S. Cl.
CPC .............. *C22C 9/04* (2013.01); *B22D 11/004* (2013.01); *C21D 8/0221* (2013.01);
(Continued)

(58) Field of Classification Search
CPC ....................................................... C22C 9/04
See application file for complete search history.

(56) References Cited

U.S. PATENT DOCUMENTS

| 8,388,228 B2 | 3/2013 | Toda et al. |
| 2008/0219881 A1 | 9/2008 | Gaag |

(Continued)

FOREIGN PATENT DOCUMENTS

| DE | 1 558 707 | 4/1970 |
| DE | 41 39 063 A1 | 6/1993 |

(Continued)

OTHER PUBLICATIONS

Elshennawy. "Continuous Casting". Manufacturing Process and Materials, 5th Edition. Society of Manufacturing Engineers (SME), Jan. 2, 2015 - pp. 211-212 (Year: 2015).*

(Continued)

*Primary Examiner* — Matthew E. Hoban
(74) *Attorney, Agent, or Firm* — Flynn Thiel, P.C.

(57) ABSTRACT

A copper-zinc alloy having the following composition (in % by weight):
from 67.0 to 69.0% of Cu,
from 0.4 to 0.6% of Si,
from 1.2 to 1.6% of Mn,
from 0.03 to 0.06% of P,
optionally up to a maximum of 0.5% of Al,
optionally up to a maximum of 0.15% of Ni,
optionally up to a maximum of 0.1% of Fe,
optionally up to a maximum of 0.1% of Pb,
optionally up to a maximum of 0.08% of Sn,
optionally up to a maximum of 0.1% of S,
balance Zn and unavoidable impurities. The alloy has a microstructure which consists of an α-phase matrix in which inclusions of manganese silicides having a globular shape are present in a proportion of at least 2% by volume and not more than 5% by volume.

10 Claims, 1 Drawing Sheet

(51) Int. Cl.
*F16C 33/00* (2006.01)
*B22D 11/00* (2006.01)
*C21D 8/02* (2006.01)
*C21D 9/00* (2006.01)

(52) U.S. Cl.
CPC ......... *C21D 8/0247* (2013.01); *C21D 9/0068* (2013.01); *C22F 1/08* (2013.01); *F16C 33/00* (2013.01)

(56) References Cited

U.S. PATENT DOCUMENTS

| | | |
|---|---|---|
| 2008/0240973 A1 | 10/2008 | Gaag et al. |
| 2009/0022620 A1 | 1/2009 | Weber |
| 2012/0251383 A1 | 10/2012 | Toda et al. |
| 2013/0078137 A1 | 3/2013 | Gaag |
| 2013/0089459 A1 | 4/2013 | Toda et al. |
| 2016/0040269 A1 | 2/2016 | Huettner et al. |

FOREIGN PATENT DOCUMENTS

| | | |
|---|---|---|
| DE | 10 2005 015 467 A1 | 10/2006 |
| DE | 10 2005 059 391 A1 | 6/2007 |
| DE | 10 2007 029 991 B4 | 1/2009 |
| DE | 10 2007 063 643 A1 | 10/2009 |
| DE | 10 2013 008 822 A1 | 11/2014 |
| JP | 62297429 | * 12/1987 |
| JP | 62297429 A | 12/1987 |
| JP | 09316570 A | 12/1997 |

OTHER PUBLICATIONS

Office Action of German Patent Office issued in Application No. 10 2015 004 221.1 dated Jul. 8, 2016 (6 pages).

Search Report of European Patent Office issued in Application No. 16 00 0420 with English translation of category of cited documents dated Aug. 17, 2016 (6 pages).

* cited by examiner

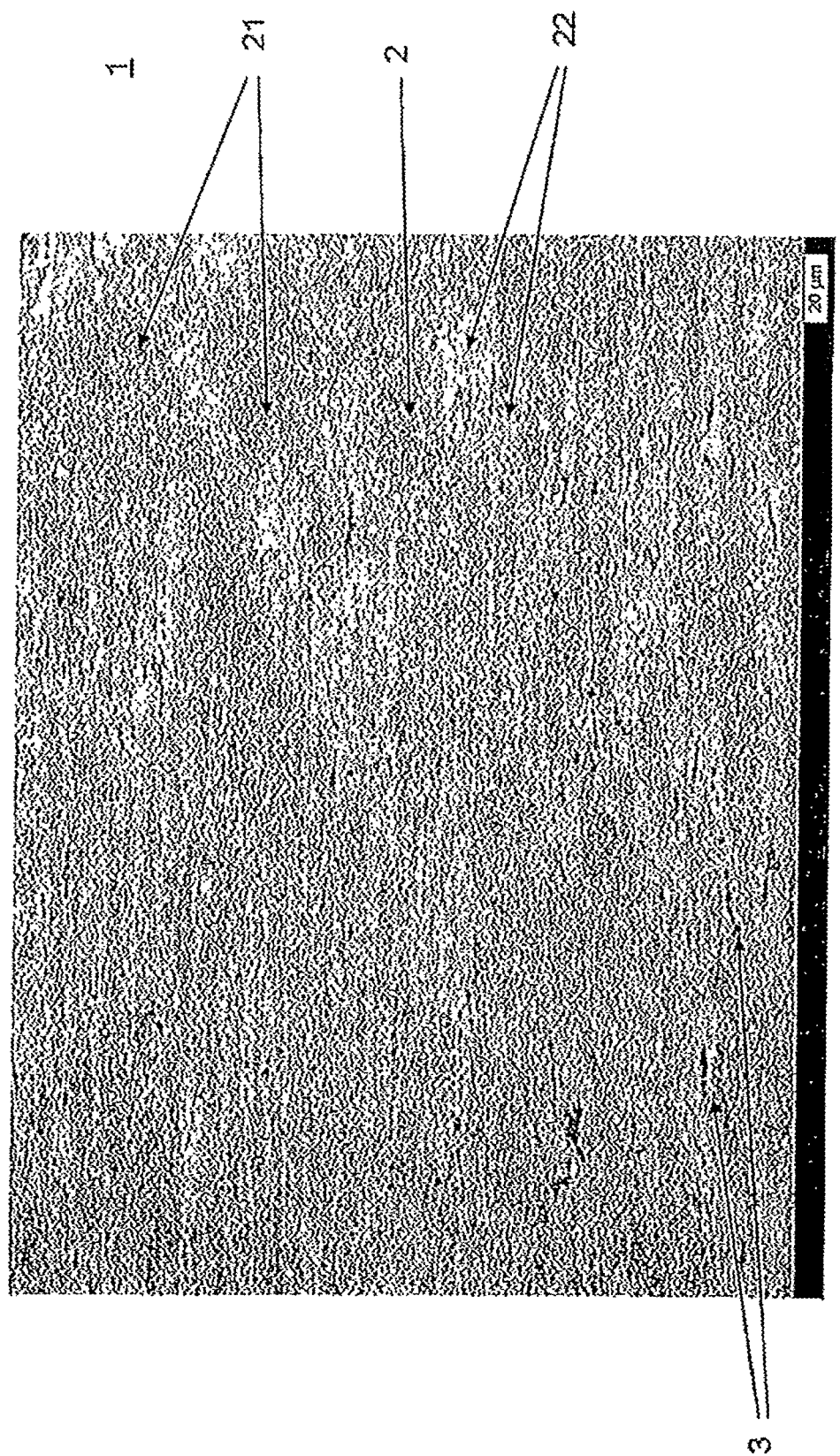

COPPER-ZINC ALLOY, BAND MATERIAL COMPOSED THEREOF, PROCESS FOR PRODUCING A SEMIFINISHED PART COMPOSED OF A COPPER-ZINC ALLOY AND SLIDING ELEMENT COMPOSED OF A COPPER-ZINC ALLOY

CROSS-REFERENCE TO RELATED APPLICATIONS

This application claims the priority of the German patent application DE 10 2015 004 221.1, the disclosure of which is hereby incorporated by reference in its entirety into this application.

FIELD OF THE INVENTION

The invention relates to a copper-zinc alloy, a band material composed of a copper-zinc alloy, a process for producing semifinished parts and also a sliding element.

The use of lead-reduced copper-zinc alloys which contain manganese-containing silicides for sliding elements is known. Silicides give, as hard phases of a copper-zinc alloy, a high resistance to abrasive wear. Furthermore, owing to their low tendency to undergo welding, they bring about a better resistance to adhesive wear. The alloys also usually contain further alloy constituents in a considerable amount, for example Al, Ni and Fe. The microstructure of such alloys consists either of a combination of α- and β-phase or predominantly of β-phase. Semifinished parts composed of such alloys are usually produced by processes which comprise at least one hot forming step.

BACKGROUND OF THE INVENTION

Copper-zinc alloys comprising manganese silicides are known from the document JP 09316570 A. In these alloys, the proportion of β-phase is up to 30%. The alloys do not contain any phosphorus. The alloys are cast as cylindrical blocks having a diameter of 120 mm. Two hot forming steps at 700° C. and 700-750° C., respectively, are subsequently carried out.

Furthermore, synchronizing rings composed of lead-reduced copper-zinc alloys are known from the document DE 10 2005 059 391 A1. The alloys contain manganese in proportions of from 0.5 to 5% by weight, silicon in proportions of from 0.3 to 2% by weight, aluminum in proportions of from 0.5 to 2.5% by weight, iron in proportions of from 0.3 to 1% by weight and nickel in proportions of from 0.5 to 5% by weight. The phosphorus content is less than 0.02% by weight. Intermetallic phases composed of manganese, iron and silicon are present in the alloys. The copper content varies in the range from 55 to 75% by weight, so that it can be assumed that the phase composition of the respective material is of subordinate importance. The synchronizing rings are produced by cutting machining. The document gives no information about the production of the starting material used there.

In addition, the document DE 10 2007 029 991 B4 discloses copper-zinc alloys which are improved in respect of cold formability and also processes for producing tubes and rods composed of these alloys. In the copper-zinc alloys, the proportions of silicon, manganese, iron and nickel are set so that both iron-nickel-manganese-containing mixed silicides having a stem-like shape and also mixed silicides which are enriched in iron and nickel and have a globular shape are present in the microstructure of the material. The microstructure of the material consists of an α-matrix in which at least 5% by volume and up to 50% by volume of β-phase is embedded in addition to the silicides. The globular silicides are seen as the reason for stabilization of the β-phase taking place. The heterogeneous matrix structure made up of α- and β-phase together with the extraordinarily high content of hard phases, in particular the iron-nickel-manganese-containing mixed silicides, ensures a desirable complex wear resistance of the components composed of these alloys. The processing of the alloy comprises extrusion in a temperature range from 600 to 800° C. This hot forming is promoted by the microstructure having up to 50% by volume of β-phase in the cast state. Tubes composed of these alloys achieve elongation at break values of up to about 13%.

The prior art thus does not disclose any manganese silicide-containing copper-zinc alloys from which materials which have excellent properties for use as sliding elements can be produced by means of processes which comprise only cold forming steps as forming steps.

SUMMARY OF THE INVENTION

It is an object of the invention to provide an improved alloy from which materials having excellent tribological properties can be produced in a casting and forming process which comprises only cold forming steps as forming steps. Furthermore, it is an object of the invention to provide a process for producing a semifinished part composed of such an alloy and also a sliding element composed of such an alloy.

The invention is defined in respect of an alloy, in respect of a band material, in respect of a process and in respect of a sliding element. The further dependent claims relate to advantageous embodiments and further developments of the invention.

The invention encompasses a copper-zinc alloy having the following composition (in % by weight):
from 67.0 to 69.0% of Cu,
from 0.4 to 0.6% of Si,
from 1.2 to 1.6% of Mn,
from 0.03 to 0.06% of P,
optionally up to a maximum of 0.5% of Al,
optionally up to a maximum of 0.15% of Ni,
optionally up to a maximum of 0.1% of Fe,
optionally up to a maximum of 0.1% of Pb,
optionally up to a maximum of 0.08% of Sn,
optionally up to a maximum of 0.1% of S,
balance Zn and unavoidable impurities. According to the invention, the alloy has a microstructure which consists of an α-phase matrix in which inclusions of manganese silicides having a globular shape are present in a proportion of at least 2% by volume and not more than 5% by volume.

The invention proceeds from the idea that the composition of a copper-zinc alloy containing manganese silicides has to be selected in an appropriate way in order for a material having excellent sliding properties to be able to be produced from the alloy in a metallurgical process which comprises only cold forming steps as forming steps. The material should thus be able to be produced by a forming process which does not comprise any hot forming steps, for example hot rolling or hot pressing. It has surprisingly been found that a material which has a microstructure consisting of a pure α-phase matrix in which manganese silicides having a globular shape are embedded can be produced from a cast body having the above-specified alloy composition by a sequence of cold forming steps and heat treatments. The proportion of these globular manganese silicides is at least 2% by volume and not more than 5% by volume. The quantitative selection of the alloy elements, in particular that of the elements Cu, Zn, Fe, Ni and Al, is made so that the matrix of the material contains only α-phase and no β-phase. This gives the material excellent cold formability.

The matrix has a cubic face-centered crystal lattice. The material thus differs from conventional brass materials for sliding applications. Brass materials having a cubic face-centered crystal lattice have, on the basis of experience, a tendency to adhere and thus to wear. Contrary to this experience, a material composed of an alloy according to the invention displays excellent tribological properties, in particular as a sliding element. The reason for this is the selection according to the invention of the proportions of the elements Mn and Si in relation to the composition of the matrix. The amount, size, shape and distribution of the manganese silicides influence the properties of the material, especially the brittleness at ambient temperature and at elevated temperature. However, the silicides also influence the formability of the material. In the case of the composition according to the invention of the alloy, manganese silicides having a globular shape are predominantly formed. The proportion of these manganese silicides is at least 2% by volume and not more than 5% by volume in the material. Compared to conventional brass materials which are used in sliding applications and contain manganese silicides, the proportion by volume of the manganese silicides in the alloy of the invention is low. A proportion of silicides above 5% by volume would have an adverse effect on the castability and cold formability of the material. The proportion of silicides is preferably not more than 4% by volume, since the castability and cold formability of the material are particularly advantageous in this range. At a proportion of silicides below 2% by volume, the strength properties and the tribological properties of the material, especially the wear resistance, would be unsatisfactory. The proportion of silicides thus has to be set within a narrow window in order to allow, firstly, a production process without hot forming and, secondly, to ensure the required mechanical and tribological properties of the material. Particularly advantageous properties are obtained when the Mn content is at least 1.3% by weight and not more than 1.45% by weight.

The phosphorus content is at least 0.03% by weight and not more than 0.06% by weight. Phosphorus serves the purpose of deoxidation. Free phosphorus promotes the castability of the alloy by reducing the viscosity of the melt. In addition, it improves the properties of the alloy of the invention under stress at high temperature. On the other hand, phosphorus can form brittle phosphides with other alloy constituents. The proportion of phosphorus therefore has to be controlled precisely: at less than 0.03% by weight, the improvement in the castability and the hot strength is unsatisfactory. When the phosphorus content is more than 0.06% by weight, the risk of phosphide formation is too great. The phosphorus content is preferably not more than 0.05% by weight, particularly preferably at least 0.035% by weight and not more than 0.045% by weight. In this narrow window, the alloy displays excellent properties in respect of processability and wear resistance.

The alloy optionally additionally contains up to a maximum of 0.50% by weight of aluminum. In these amounts, aluminum is completely soluble in the alloy. However, larger additions of aluminum would promote formation of the β-phase. A reduction in the maximum content of Al to 0.45% by weight, more advantageously to 0.40% by weight, is preferred in this respect. Furthermore, aluminum acts as a corrosion protectant. It has been found that aluminum is advantageous when the alloy is quenched by means of water after casting. In this case, a relatively clean surface results. The proportion of aluminum can therefore preferably be at least 0.2% by weight.

The proportions of Ni and Fe are limited to 0.15% by weight and 0.1% by weight, respectively. When the alloy in combination with manganese is cast, iron and nickel initiate the formation of iron- or nickel- and manganese-containing mixed silicides. Such mixed silicides have a comparatively large spatial expansion. However, in the case of the present alloy of the invention, small silicides are sought and in the ideal case are pure manganese silicides. Iron and nickel make no significant contribution in the composition of the globular manganese silicides.

The proportion of Pb is limited to a maximum of 0.1% by weight, since alloys having a very low Pb content are required for sliding bearings. The proportion of Pb thus should be kept as low as technically possible and economically feasible.

The elements Sn and S are of only subordinate importance in relation to the alloy of the invention. These elements, especially Sn, are introductions from the materials circuits which are accepted for economic reasons. To prevent them from influencing the alloy in an undesirable way, their upper limits are set at the values specified in each case. Since Sn narrows the range of the α-phase, the proportion of Sn should preferably not exceed a value of 0.02% by weight.

It follows from the specified values for the individual alloy constituents that the proportion of zinc in the alloy is in the range from 27.3 to 31.4% by weight. It is preferably at least 28.5 and not more than 30.8% by weight. For cost reasons, the proportion of zinc should be as high as possible. On the other hand, it must not be too high, so that no β-phase is formed. The specified range has been found to be a particularly advantageous range.

The unavoidable impurities should in total be not more than 0.3% by weight, preferably not more than 0.05% by weight. This value is preferably also not exceeded together with the elements Sn and S.

Materials which are made without hot forming from a cast body having the alloy composition according to the invention can be characterized by the following mechanical properties at 20° C.:
  tensile strength $R_m$: at least 500 MPa, preferably at least 550 MPa
  yield point $R_{p0.2}$: at least 360 MPa, preferably at least 400 MPa
  hardness: at least 150 $H_v$, preferably at least 170 $H_v$
  elongation at break $A_{10}$: at least 15%, preferably at least 20%

A particular property of these materials is that the elongation at break at 300° C. is at least as great as at 20° C. In particular, the elongation at break at 300° C. can be greater than the elongation at break at 20° C. The elongation at break at 300° C. is typically at least 1.2 times the elongation at break at 20° C. This particular property is advantageous in applications involving bearings which are subject to high stresses. Even at elevated temperature, it guarantees a high ductility and thus ensures satisfactory compatibility of the bearing material for particles.

In a preferred embodiment of the invention, the ratio of Cu content of the alloy to the Zn equivalent of the alloy can be at least 2.1 and not more than 2.4, where the Zn equivalent of the alloy is calculated as follows from the proportions of the respective alloying elements (in % by weight):

Zn equivalent=proportion of Zn+0.9×proportion of Fe−1.3×proportion of Ni+6×proportion of Al+2×proportion of Sn.

This particular embodiment of the invention ensures that the matrix of the material always has only α-phase. If the ratio of Cu content of the alloy to the Zn equivalent of the alloy is at least 2.1, then it is virtually impossible for β-phase to be present in the material. This additional condition for the composition of the alloy plays a role particularly when the Cu content of the alloy is in the lower part of the specified range (67-69% by weight). In such cases, the aluminum content of the alloy has to be restricted to values of not more than 0.45% by weight.

The proportions of the elements Mn and Si in the alloy are not taken into account in the calculation of the Zn equivalent. This is based on the assumption that these two elements are present virtually exclusively in the form of precipitates, i.e. as manganese silicides, in the alloy and are not dissolved in the matrix. This assumption is particularly valid when the proportion by weight of manganese is at least 2.4 times and not more than 3.4 times the proportion by weight of silicon. The proportion by weight of manganese is particularly preferably at least 2.6 times and not more than 3.2 times the proportion by weight of silicon.

The sum of iron and nickel contents can advantageously be not more than 0.22% by weight. This further suppresses the formation of iron- or nickel- and manganese-containing mixed silicides. Iron and nickel initiate the formation of these mixed silicides when the alloy is cast. The lower the total amount of these two elements, the smaller the amount of mixed silicides which can be formed. When the sum of the iron content and nickel content is not more than 0.15% by weight, then the formation of mixed silicides is significantly limited.

In an advantageous embodiment of the invention, the manganese silicides having a globular shape can be present in finely divided form in the matrix and have a size of not more than 1 µm, with from 30 to 50 manganese silicides having a globular shape being present per 100 µm². This configuration of the silicides is the cause of the excellent tribological properties of the alloy, especially when employed as sliding bearing. Manganese silicides can be of the $Mn_5Si_3$ or MnSi type. Studies on the molar composition of the silicides have shown that both types are present, approximately with the same abundance, in the alloy of the invention. The manganese silicides have a globular, i.e. spherical or at least sphere-like, shape. Their size is not more than 1 µm. The sphere diameter or more generally the sphere-equivalent diameter is used here as measure of the size. The silicides are present in finely divided form in the matrix. In the polished section, they appear like finely dispersed droplets which are distributed with slightly varying density, i.e. not homogeneously, in the matrix. There are thus regions having a silicide density which deviates in a higher direction from the average silicide density, and there are likewise regions in which the silicide density deviates in a lower direction from the average silicide density. This phenomenon can be described as like wafts of mist or cloud-like. At a 500-fold magnification, from 30 to 50 globular particles can be counted per 100 µm².

In a preferred embodiment of the invention, manganese silicides having a stem-like shape can be additionally present in the matrix, with the longitudinal extension of these manganese silicides being not more than 50 µm, preferably not more than 30 µm, and the number of the manganese silicides having a stem-like shape being not more than 2% of the number of manganese silicides having a globular shape. For the present purposes, a stem-like shape is a shape of the silicides in which a plurality of individual silicide particles are arranged at a small distance from one another along a line. The individual silicide particles of such an arrangement are larger than the manganese silicides having a globular shape, for which reason the manganese silicides having a stem-like shape are readily recognizable and show up clearly before the background of the finely divided globular manganese silicides. The size of the individual silicide particles belonging to a manganese silicide having a stem-like shape is typically in the range from 1 µm to 10 µm. The arrangement of the silicides having a stem-like shape is reminiscent of the arrangement of links of a chain or of the arrangement of pearls on a string, so that the adjectives "chain-like" or "string-of-pearls-like" can also be used descriptively as synonyms for "stem-like". The longitudinal extension of such an arrangement of manganese silicides is not more than 50 µm. These manganese silicides having a stem-like shape are remnants of larger silicides which can form by diffusion and agglomeration of primary precipitates immediately after casting during solidification and cooling of the alloy and are broken up and stretched during cold forming of the material. The small manganese silicides having a globular shape are advantageous for the properties of the alloy. For this reason, the casting and cooling operation is preferably configured so that very few large silicides but instead many small silicides can be formed. The size and abundance of the stem-like manganese silicides is thus a measure of how good the process conduction during the casting and cooling operation was: the smaller the longitudinal extension of the stem-like manganese silicides is and the fewer of these stem-like manganese silicides are present in the material, the better the used amounts of manganese and silicon are utilized in order to form small manganese silicides having a globular shape. This is advantageous for the properties of the material. The longitudinal extension of the stem-like manganese silicides is preferably not more than 10 µm. The number of manganese silicides having a stem-like shape is not more than 2%, preferably not more than 1%, of the number of manganese silicides having a globular shape.

However, it is not possible to rule out that the relatively large manganese silicides having a stem-like shape have an advantageous effect by, as hard particles, reducing the tendency for the material to adhere. A further possible advantage of manganese silicides having a stem-like shape can be that, owing to diffusion of the precipitates primarily formed in the immediate vicinity of these relatively large manganese silicides, zones which are free of precipitate particles are formed. As a phase having a cubic face-centered lattice, these particle-free zones contribute to the dynamic strength of the material since they allow plastic deformation.

A further aspect of the invention relates to a band material composed of a copper-zinc alloy according to the above-described invention. For the present purposes, the term band material encompasses all materials having a sheet-like format, i.e., for example, bands, metal sheets and metal strips. Such formats are produced by forming by means of rolling processes. The band material is preferably produced from the alloy of the invention in a forming process which comprises only cold forming steps as forming steps. The material can thus be produced by a process which does not comprise any hot forming, for example hot rolling. The band material is preferably produced by the alloy of the invention being cast as a band-like cast body having such a small thickness that only cold forming steps are necessary as forming steps to achieve the final dimension of the band. The advantage of a band material produced in this way is the low energy consumption, since heating of the material to carry out hot forming can be dispensed with. The band material is highly suitable for producing components which are subjected to sliding friction and are made of band material, for example rolled bearing bushings or thrust washers. Furthermore, such a band material can be joined to another material to form a band-like composite. Suitable joining processes are preferably cladding processes, in particular laser-assisted roller cladding. Composites composed of a copper-based bearing metal and a support material, for example steel, can be used as starting material for producing bearing half-shells.

A further aspect of the invention relates to a process for producing a semifinished part composed of a copper-zinc alloy according to the invention, where the process comprises the following steps:
a) melting of the alloy,
b) casting of a cast body,
c) cold forming,
d) heat treatment.

The process comprises only cold forming steps as forming steps. The alloy of the invention has a microstructure which consists of an α-phase matrix in which inclusions of manganese silicides having a globular shape are present in a proportion of at least 2% by volume and up to 5% by volume. The specific combination of pure α-phase matrix and specially conditioned manganese silicides embedded therein makes it possible to produce semifinished parts without hot forming having to be carried out. Here, the alloy of the invention is melted, cast as a suitable cast body and cooled. It should be ensured here that the solidification and cooling of the alloy is sufficiently rapid for the formation of large silicides by diffusion to be largely suppressed. The cooled cast body is formed to give the final shape in one or more cold forming steps. Heat treatments can be carried out after casting, between the individual cold forming steps and after the last cold forming step. Temperature profile and duration of the heat treatments should be selected appropriately. If necessary, the surface of the intermediate can be subjected to cutting machining before a cold forming step. The advantage of this production process for semifinished parts is the low energy consumption, since heating of the material for carrying out a hot forming step can be dispensed with.

In an advantageous embodiment of the process of the invention, a band having a thickness of not more than 20 mm, preferably not more than 15 mm, can be cast in process step b) in order to produce a band-like semifinished part. In such a band casting process, a relatively thin band is cast instead of a slab having large dimensions. The width of the cast band is typically in the range from 200 to 600 mm. Owing to the low thickness of the cast band, only cold rolling steps are necessary as forming steps in order to achieve the final dimensions of the band. The hot rolling of a slab having large dimensions can be dispensed with. Furthermore, comparatively few cold rolling steps are necessary overall. The number of cold rolling steps depends on the thickness of the cast band and the thickness of the finished band. In a typical embodiment of the process of the invention, the thickness of the band is reduced by at least 20% and not more than 50% of its respective starting thickness in each cold rolling step. The number of cold rolling steps is thus typically at least two and not more than five. The production process is consequently very inexpensive.

In this production process, adherence to the phosphorus content is of particularly great importance since casting of a thin band requires a fluid melt, i.e. a melt having a low viscosity. The aluminum content of the alloy can preferably be at least 0.2% by weight in this production process. The positive influence of aluminum in quenching of the alloy with water is important in this process.

In a particularly advantageous embodiment of the process of the invention, the casting of the band in process step b) can be carried out continuously. The continuous casting of the band reduces the production costs further. Unevennesses in the composition and in the microstructure of the material which can occur at the beginning of the casting operation are unimportant in continuous band casting.

A further aspect of the invention relates to a sliding element which consists entirely or at least partly of a copper-zinc alloy according to the invention. The advantages achieved by the invention are, in particular, that such a sliding element displays excellent tribological properties. The material of the sliding element has an α-phase matrix having a cubic face-centered crystal lattice. The material therefore differs from conventional brass materials for sliding applications. Brass materials having a cubic face-centered crystal lattice are known, on the basis of experience, to have, in contrast to materials comprising β-phase, a tendency to adhere. Contrary to this experience, a sliding element which consists entirely or at least partly of a material composed of an alloy according to the invention displays no tendency to adhere and has a very good wear resistance.

The part of the sliding element which consists of an alloy according to the invention is preferably produced by a process as described above. The process comprises only cold forming steps as forming steps. The material of the sliding element of the invention has a microstructure consisting of an α-phase matrix in which inclusions of manganese silicides having a globular shape are present in a proportion of at least 2% by volume and up to 5% by volume. The specific combination of pure α-phase matrix and specially conditioned manganese silicides embedded therein makes it possible to produce the sliding element without hot forming having to be carried out.

A further aspect of the invention relates to a sliding element which consists entirely or at least partly of a band material according to the invention as described above. In particular, the part of the sliding element which consists of an alloy according to the invention can have been produced by the above-described band casting process. The particular advantages of such a sliding element are its low production costs and its excellent tribological properties. Examples of such sliding elements are rolled bearing bushings, thrust washers and synchronizing rings.

BRIEF DESCRIPTION OF THE DRAWINGS

The invention is illustrated with the aid of the following examples and the FIGURE. The FIGURE shows:
FIG. 1 a polished section of a material composed of an alloy according to the invention.

DETAILED DESCRIPTION

For experiments, two alloys according to the invention and four comparative alloys were produced. The composition of the alloys in % by weight is shown in table 1. The respective Zn equivalent (in % by weight) is given in the penultimate column of the table. In the last column, the value for the ratio of Cu content of the alloy to the Zn equivalent of the alloy is indicated. The two test alloys as per rows 1 and 2 of table 1 and also the comparative alloy 4 have a pure α-phase matrix, while the three comparative alloys 1, 2 and 3 as per rows 3 to 5 have a microstructure comprising α- and β-phase. The reason for the latter is the relatively high Zn equivalent of these alloys.

TABLE 1

Composition of the test and comparative alloys in % by weight

|        | Cu   | Zn   | Mn   | Fe   | Ni   | Si   | Al   | P     | Pb   | Sn    | Others | Zn eq. | Cu/Zn eq. |
|--------|------|------|------|------|------|------|------|-------|------|-------|--------|--------|-----------|
| Test 1 | 67.5 | 30.2 | 1.32 | 0.08 | 0.14 | 0.43 | 0.25 | 0.035 | 0.05 | 0.002 | 0.02   | 31.572 | 2.14      |
| Test 2 | 68.3 | 29.3 | 1.35 | 0.05 | 0.10 | 0.46 | 0.33 | 0.043 | 0.03 | 0.002 | 0.02   | 31.214 | 2.19      |
| Comp. 1| 63.8 | 31.4 | 1.90 | 0.33 | 0.58 | 0.93 | 0.91 | 0.003 | 0.07 | 0.008 | 0.04   | 36.40  | 1.75      |
| Comp. 2| 65.0 | 30.2 | 1.94 | 0.30 | 0.76 | 0.84 | 0.80 | 0.004 | 0.09 | 0.032 | 0.01   | 34.31  | 1.89      |
| Comp. 3| 64.5 | 32.7 | 0.89 | 0.26 | 0.40 | 0.63 | 0.49 | 0.003 | 0.06 | 0.007 | 0.04   | 35.35  | 1.82      |
| Comp. 4| 69.7 | 27.9 | 0.88 | 0.23 | 0.38 | 0.42 | 0.43 | 0.036 | 0.04 | 0.008 | 0.02   | 30.19  | 2.31      |

The alloys were each melted in an amount of about 3000 kg and continuously cast as a band having a thickness of 13 mm. The cast band was rapidly cooled, heat treated, milled and rolled to a band thickness of 2.5 mm in four cold forming steps with intermediate heat treatment in each case. Finally, it was subjected to a heat treatment to relieve stresses. The two test alloys as per rows 1 and 2 of table 1 and the comparative alloy 4 could be rolled without difficulties to the final dimensions, while the comparative alloys 1, 2 and 3 could be processed only unsatisfactorily: comparative alloys 1 and 2 displayed defects even during casting. The reduction in the amount of silicide-forming elements in the case of comparative alloy 3 did lead to a stable casting process, but this alloy tended to suffer from crack formation and other problems during cold rolling. In this regard, an improvement could be achieved in the case of comparative alloy 4 by the proportion of copper being increased and the proportion of zinc being decreased compared to comparative alloy 3 and a matrix having a pure α-microstructure thus being produced.

The ductility of bearing materials both at ambient temperature and at elevated temperature is an important property in the case of bearings subjected to high stresses. The elongations at break at 20° C. and at 300° C. were therefore determined on specimens which had an alloy composition as per test 2. At a band thickness of 2.5 mm, an elongation at break of 28% could be achieved at 20° C. and of over 40% could be achieved at 300° C. In the case of a further specimen whose band thickness after five cold forming steps was 1.2 mm, the elongation at break was still above 20% at 20° C. and above 25% at 300° C. Comparative specimens produced from the alloy as per the row "Comparison 3" did achieve elongation at break values at ambient temperature which are only slightly below those of the inventive alloy, but at 300° C. elongation at break values of only 12% at a band thickness of 1.2 mm and 6% at a band thickness of 2.5 mm could be achieved on the comparative specimens. A lower elongation at break value at 300° C. than at 20° C. was also determined on comparative specimens produced from the alloy as per the row "Comparison 4". This comparison shows the particular advantages of the inventive alloy for applications in bearings which are subjected to high stresses.

Specimens composed of the alloys "Test 2" and "Comparison 4" were subjected to wear tests. Here, the specimen composed of the inventive alloy "Test 2" displayed significantly better properties than the specimen composed of the alloy "Comparison 4". In the wear test, the removal of material from the specimen "Test 2" was about 30% lower than in the case of the specimen "Comparison 4". This comparison shows that the selection of the silicide-forming elements, namely Mn, Si, Fe and Ni, has to be made within a very narrow window in order to produce a material having advantageous properties as sliding bearing.

FIG. 1 shows a polished section of an alloy according to the invention as per Test 2. It can be seen that the microstructure of the material 1 consists only of one phase, namely the α-phase. Finely dispersed manganese silicides 2 having a globular shape are embedded in this matrix. The individual globular manganese silicides 2 are very small. The distribution of the globular manganese silicides 2 is not completely homogeneous. There are regions 21 in which the density of the globular manganese silicides 2 is increased compared to the average density. There are likewise regions 22 in which the density of the globular manganese silicides 2 is decreased compared to the average density. These regions 22 appear as lighter-colored spots in the polished section. This variation in the density of the globular manganese silicides 2 gives a picture in which accumulations of globular manganese silicides 2 appear like clouds.

Apart from the globular manganese silicides 2, manganese silicides 3 having a stem-like shape are visible. As can easily be seen, a plurality of individual silicide particles having a small distance between them are arranged along a line in the case of the stem-like manganese silicides 3. The individual silicide particles of such an arrangement are larger than the globular manganese silicides 2. The size of the individual silicide particles belonging to a stem-like manganese silicide 3 is typically in the range from 1 μm to 10 μm. The longitudinal extension of the stem-like manganese silicides 3 is from about 20 to 30 μm, at most 40 μm. In the immediate vicinity of a stem-like manganese silicide 3, there are significantly fewer globular manganese silicides 2 to be found than in the other regions. This depletion can be explained by the primary precipitates growing together locally as a result of diffusion to form larger precipitates on solidification of the alloy. These larger precipitates are broken up in the subsequent cold forming steps and the fragments are aligned along the forming direction. This gives the specific appearance of the stem-like manganese silicides 3.

LIST OF REFERENCE NUMERALS 1 material
2 manganese silicide having a globular shape
21 region having a high density of manganese silicides having a globular shape
22 region having a low density of manganese silicides having a globular shape

The invention claimed is:

1. A copper-zinc alloy consisting of, in % by weight:
   from 67.5 to 68.3% of Cu,
   from 0.43 to 0.46% of Si,
   from 1.32 to 1.35% of Mn,
   from 0.035 to 0.043% of P,
   optionally up to a maximum of 0.5% of Al,
   optionally up to a maximum of 0.15% of Ni,
   optionally up to a maximum of 0.1% of Fe,
   optionally up to a maximum of 0.1% of Pb,
   optionally up to a maximum of 0.08% of Sn,
   optionally up to a maximum of 0.1% of S,
   balance Zn and unavoidable impurities,
   characterized in that the alloy has a microstructure which consists of an α-phase matrix in which inclusions of manganese silicides having a globular shape are present in a proportion of at least 2% by volume and not more than 5% by volume.

2. A copper-zinc alloy according to claim 1, characterized in that the ratio of Cu content of the alloy to the Zn equivalent of the alloy is at least 2.1 and not more than 2.4, where the Zn equivalent of the alloy is calculated as follows from the proportions of the respective alloying elements, in % by weight:

$$\text{Zn equivalent} = \text{proportion of Zn} + 0.9 \times \text{proportion of Fe} - 1.3 \times \text{proportion of Ni} + 6 \times \text{proportion of Al} + 2 \times \text{proportion of Sn}.$$

3. A copper-zinc alloy according to claim 1, characterized in that the sum of iron content and nickel content is not more than 0.22% by weight.

4. A copper-zinc alloy according to claim 1, characterized in that manganese silicides having a stem-like shape are additionally present in the matrix, with the longitudinal extension of these manganese silicides being not more than 50 μm and the number of the manganese silicides having a stem-like shape being not more than 2% of the number of the manganese silicides having a globular shape.

5. A band material composed of a copper-zinc alloy according to claim 1.

6. A process for producing a semifinished part composed of a copper-zinc alloy according to claim 1, where the process comprises the following steps:
   a) melting of the alloy,
   b) casting of a cast body,
   c) cold forming,
   d) heat treatment,
characterized in that the process comprises only cold forming steps as forming steps.

7. A process according to claim 6 for producing a band-like semifinished part, characterized in that a band having a thickness of not more than 20 mm is cast in process step b).

8. A process according to claim 7, characterized in that the casting of the band in process step b) is carried out continuously.

9. A sliding element, characterized in that it consists entirely or at least partly of a copper-zinc alloy according to claim 1.

10. A sliding element, characterized in that it consists entirely or at least partly of a band material according to claim 5.

* * * * *